United States Patent [19]
Ozaki

[11] Patent Number: 5,602,581
[45] Date of Patent: Feb. 11, 1997

[54] TELEVISION RECEIVER CONTROL BOX THAT CONTAINS A CARD READER MOUNTED DIRECTLY TO A MOTHERBOARD

[75] Inventor: Arthur H. Ozaki, Escondido, Calif.

[73] Assignees: Sony Corporation, Tokyo, Japan; Sony Electronics, Inc., Park Ridge, N.J.

[21] Appl. No.: 663,735

[22] Filed: Jun. 14, 1996

Related U.S. Application Data

[63] Continuation of Ser. No. 363,653, Dec. 22, 1994, abandoned.

[51] Int. Cl.⁶ .................................................. H04N 7/16
[52] U.S. Cl. ........................ 348/10; 348/3; 455/6.2; 455/2; 361/752
[58] Field of Search ........................ 348/3, 1, 2, 10, 348/6, 8, 12, 13; 455/2, 4.1, 4.2, 5.1, 6.2, 6.3; 235/380, 382, 382.5; 340/825.33; 361/752, 753, 814; 312/223.2, 223.1; H04N 7/16

[56] References Cited

U.S. PATENT DOCUMENTS

| | | | |
|---|---|---|---|
| 4,591,937 | 5/1986 | Nakarai et al. | 360/101 |
| 4,711,993 | 12/1987 | Kosednar et al. | 235/380 |
| 4,731,702 | 3/1988 | Hiatt et al. | 361/752 |
| 4,791,531 | 12/1988 | Jessup | 361/752 |
| 4,870,604 | 9/1989 | Tatsuno | 364/708 |
| 5,105,268 | 4/1992 | Yamanouchi et al. | 348/10 |
| 5,173,589 | 12/1992 | Diehl et al. | 348/1 |
| 5,226,826 | 7/1993 | Nillson et al. | 439/72 |
| 5,239,166 | 8/1993 | Graves | 235/380 |
| 5,252,815 | 10/1993 | Pernet | 235/441 |
| 5,290,174 | 3/1994 | Woratyla et al. | 439/59 |
| 5,297,966 | 3/1994 | Brennian, Jr. et al. | 439/64 |
| 5,319,454 | 6/1994 | Schutte | 348/5.5 |
| 5,333,100 | 7/1994 | Anhalt et al. | 361/752 |
| 5,362,951 | 11/1994 | Kanazawa et al. | 235/449 |
| 5,426,701 | 6/1995 | Herrmann et al. | 348/10 |
| 5,432,327 | 7/1995 | Price | 235/448 |
| 5,437,294 | 7/1996 | Siwinski | 361/753 |

FOREIGN PATENT DOCUMENTS 266795  10/1990  Japan .............................. H04Q 9/00

Primary Examiner—John K. Peng
Assistant Examiner—Chris Grant
Attorney, Agent, or Firm—Blakely, Sokoloff, Taylor & Zafman

[57] ABSTRACT

A television receiver control box which has a motherboard located within an inner cavity of a box housing. Mounted directly to the motherboard is a card reader which can read a credit card inserted through a slot of the box. Both the card and the slot can be concealed by a door that is locked and pivotally connected to a front panel of the control box.

3 Claims, 2 Drawing Sheets

TELEVISION RECEIVER CONTROL BOX THAT CONTAINS A CARD READER MOUNTED DIRECTLY TO A MOTHERBOARD

This is a Continuation Application of application Ser. No. 08/363,653, filed Dec. 22, 1994 now abandoned.

BACKGROUND OF THE INVENTION

1. Field of the Invention

The present invention relates to a television receiver control box for a satellite television system.

2. Description of Related Art

There exist satellite based television broadcasting systems which allow the end user to receive television transmissions directly from a satellite. The television transmissions are received by a satellite dish which is coupled to a television set by a control box. The control box is typically placed adjacent to the television set and is connected to both the set and the satellite dish by cables.

There is a satellite based television broadcasting system being marketed under the trademark DirecTV which allows the user to purchase programing with a credit card that has a machine readable integrated circuit embedded therein. RCA Corporation has developed a control box which contains a magnetic strip reader that can read a credit card that is inserted through a slot of the box. The end user is thus able to readily purchase programing from the system. The magnetic strip reader of the RCA unit is mounted to a printed circuit board located within the control box. The printed circuit board is supported above the motherboard of the control box by a bracket assembly. The bracket assembly contains a number of parts and fasteners that must be assembled during the production of the unit. The inclusion of the bracket assembly increases the assembly time and cost of producing the control box. It would be desirable to provide a television control box which contained a card reader which requires less time to assemble than the RCA unit.

SUMMARY OF THE INVENTION

The present invention is a television receiver control box which has a motherboard located within an inner cavity of a box housing. Mounted directly to the motherboard is a card reader which can read a credit card inserted through a slot of the box. Both the card and the slot can be concealed by a door that is locked and pivotally connected to a front panel of the control box.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
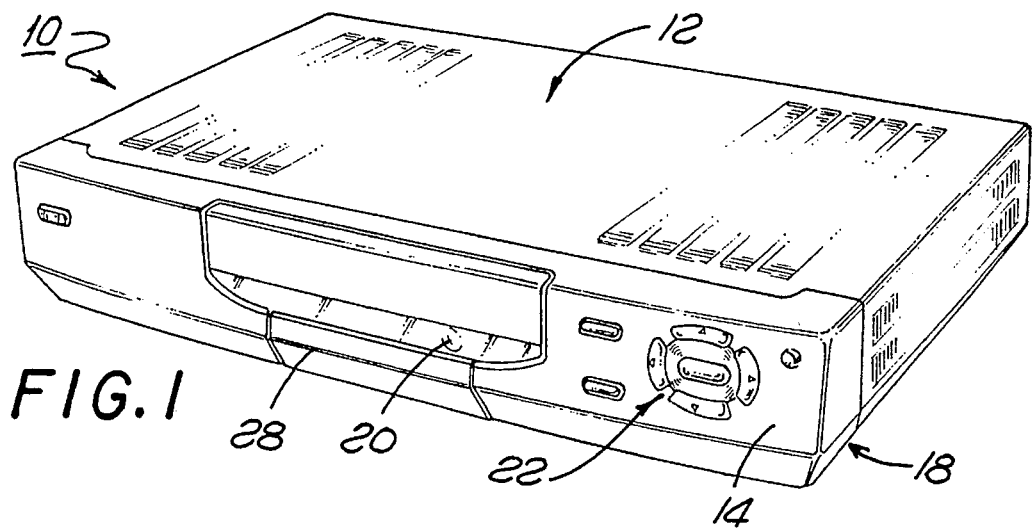
FIG. 1 is a perspective view of a television receiver control box of the present invention.

Referring to the drawings more particularly by reference numbers, FIG. 1 shows a television receiver control box 10 of the present invention. The control box 10 can provide an interface between a television set (not shown) and a satellite dish (not shown). The control box 10 contains electronic devices which allow the television set to interface with the satellite dish. The control box 10 may also contain a tuner which allows the end user to change the channels of the television. The box 10 has a housing 12 which includes a front panel member 14 and a cover 16 that are attached to a base plate 18. The front panel 14 has an infrared receiver port 20 which receives input commands from a remote controller (not shown), thus allowing the end use to remotely control the system. The front panel 14 may also have a plurality of buttons 22 which allow the end user to provide inputs to the box 10 without the remote controller.

Figure 2:
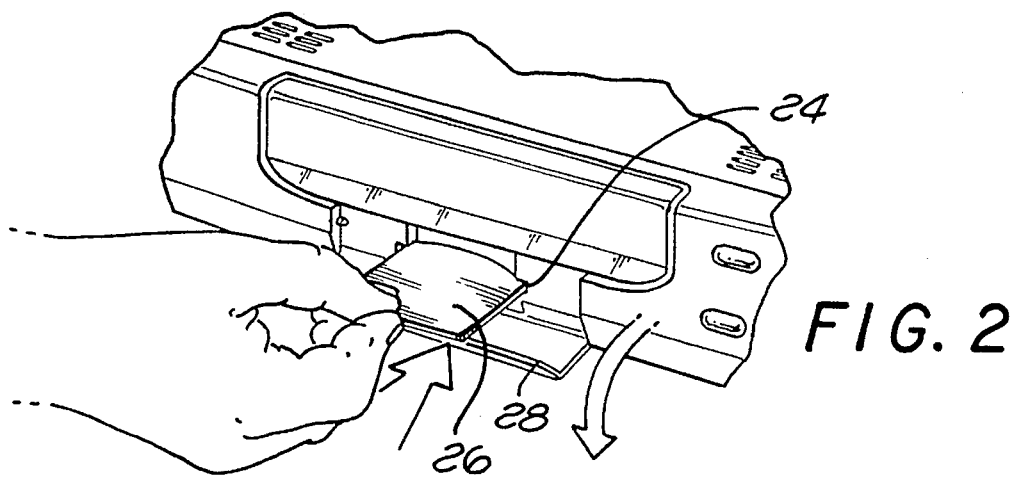
FIG. 2 is a perspective view showing a credit card inserted into the television receiver control box.

As shown in FIG. 2, the front panel 14 has a slot 24 that provides access to a credit card 26. The credit card 26 is read by the control box 10 so that the end user can purchase programming from the broadcasting system. The slot 24 can be concealed by a door 28 that is pivotally attached to the front panel 14. The door 28 may have a lock that prevents undesirable access to an inserted card, such as when the box 10 is displayed in a retail show room.

Figure 3:
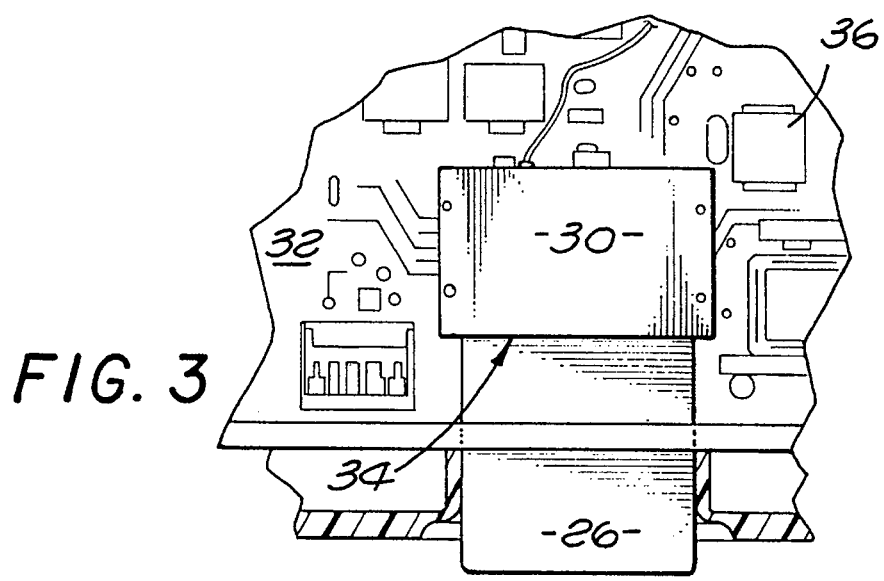
FIG. 3 is a top sectional view of the control box.

As shown in FIG. 3, the credit card 26 is read by a magnetic strip reader 30. The credit card 26 may have a machine readable integrated circuit or magnetic strip attached to the card. The card reader 30 may be a device sold by News DataCom of Great Britain. The card reader 30 is soldered directly to a motherboard 32 located within an inner cavity of the base plate 18. The reader 30 has a slit 34 that is aligned with the front panel slot 24 and receives the credit card 26. The motherboard 32 contains a plurality of integrated circuits 36 which provide the electrical functions of the box 10.

Figure 4:
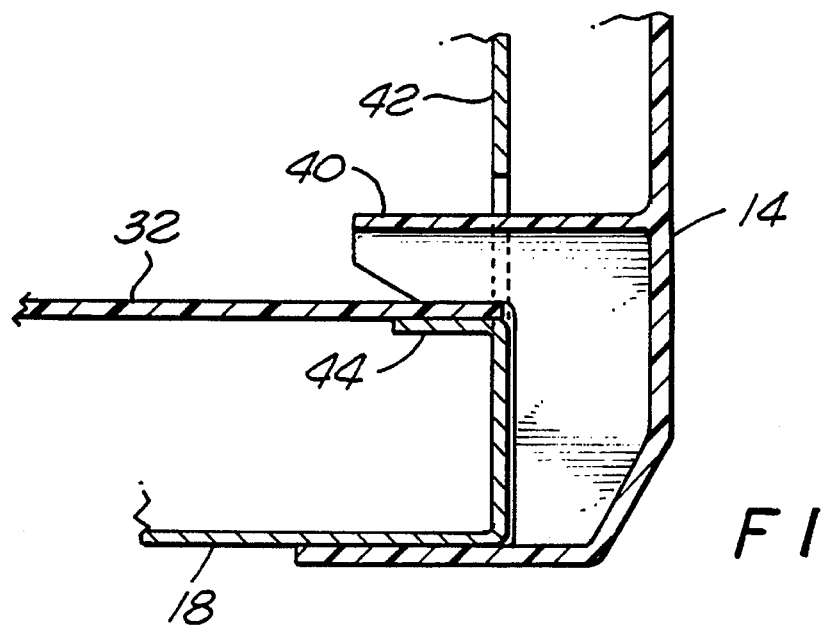
FIG. 4 is a side cross-sectional view showing a front panel support bar which restrains an edge of the printed circuit board.

As shown in FIG. 4, the front panel 14 has a plurality of support bars 40 that extend through a front wall 42 of the base plate 18 and restrain a top edge of the motherboard 32. The bottom of the motherboard 32 is supported by a plurality of tabs 44 that are bent from the base plate 18. The tabs 44 and support bars 40 secure the motherboard 32 to the base plate 18 without any fasteners. The absence of fasteners reduces the assembly time and the cost of producing the box 10.

Figure 5:
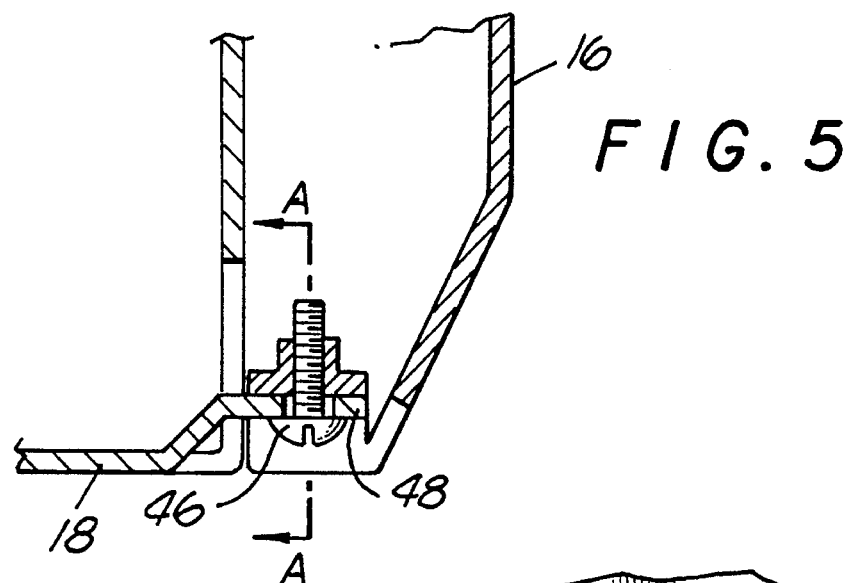
FIG. 5 is a side cross-sectional view showing a cover attached to a base plate.
Figure 5A:
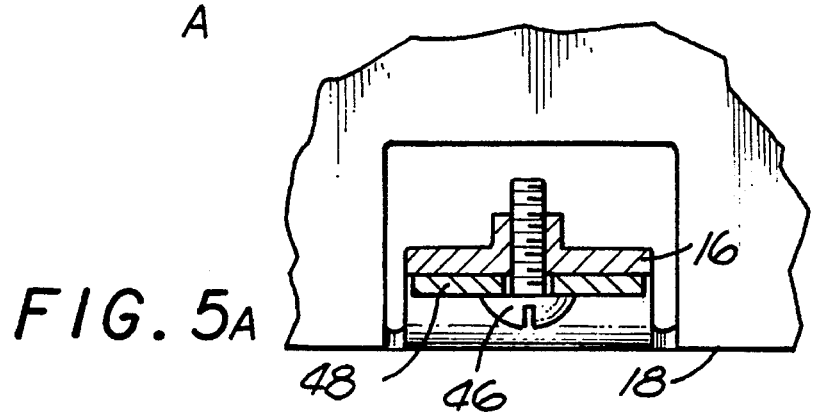
FIG. 5a is a cross-sectional view taken at line A—A of FIG. 5.

As shown in FIG. 5, the cover 16 is attached to the base plate 18 by fasteners 46 screwed into the bottom of the box. Locating the fasteners 46 at the bottom of the housing improves the overall appearance of the control box 10. The fasteners 46 are screwed into the threaded holes of the cover 16. The fasteners 46 extend through clearance holes in tabs 48 which extend from the base plate. The tabs 48 and corresponding cover portions are inset from the bottom of the housing to further conceal the fasteners from view.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A television receiver control box that accepts a machine readable card, comprising:

a base plate that has a U-shaped tab;

a motherboard that is supported by said U-shaped tab;

a cover that is attached to said base plate and encloses said motherboard;

a front panel that is attached to said base plate, said front panel having a slot which provides access to the card, said front panel further having a support bar which captures said motherboard to impede movement of said motherboard in a vertical direction and a lateral direction;

and, a card reader mechanically mounted directly to said motherboard.

2. The control box as recited in claim 1, wherein said front panel has a pivoting door which conceals said slot.

3. The control box as recited in claim 2, wherein said base plate has a plurality of tabs that each have a clearance hole which is aligned with a corresponding threaded hole in said cover.

* * * * *